United States Patent [19]

Paulsen

[11] Patent Number: 4,990,808
[45] Date of Patent: Feb. 5, 1991

[54] SYMMETRICAL RESONANT SCANNER AND DRIVE

[75] Inventor: Dean R. Paulsen, Watertown, Mass.

[73] Assignee: General Scanning, Inc., Watertown, Mass.

[21] Appl. No.: 303,941

[22] Filed: Jan. 30, 1989

Related U.S. Application Data

[63] Continuation-in-part of Ser. No. 14,998, Feb. 17, 1987, Pat. No. 4,878,721.

[51] Int. Cl.⁵ ......................... H02K 3/28; G02B 26/10
[52] U.S. Cl. .................................... 310/113; 310/208; 336/188; 350/6.6
[58] Field of Search ...................... 310/27, 36, 38, 113, 310/155, 194, 254, 208; 324/76 R, 97, 99, 207, 208, 226; 335/272; 336/188, 135; 346/109; 350/6.5, 6.6, 99; 358/208; 250/232; 318/132

[56] References Cited

U.S. PATENT DOCUMENTS

| | | |
|---|---|---|
| 2,376,557 | 5/1945 | Severance . |
| 2,400,262 | 5/1946 | Quinnell . |
| 3,473,855 | 10/1969 | Pitner .................................. 384/465 |
| 3,532,408 | 10/1970 | Dostal ...................................... 350/6 |
| 3,595,673 | 5/1976 | Montagu ............................... 310/38 |
| 3,609,485 | 9/1971 | Dostal ................................... 318/132 |
| 3,691,822 | 9/1972 | Deckard .............................. 73/71.6 |
| 4,053,828 | 10/1977 | Ambler et al. ...................... 336/188 |
| 4,090,112 | 5/1978 | Selverstone ......................... 318/132 |
| 4,364,000 | 12/1982 | Burke, Jr. ............................ 318/128 |
| 4,368,489 | 1/1983 | Stemme et al. ..................... 358/208 |
| 4,502,752 | 3/1985 | Montagu .............................. 350/6.6 |
| 4,705,975 | 11/1987 | Ritzinger ............................. 310/162 |
| 4,753,498 | 6/1988 | Paulsen ................................ 350/6.8 |
| 4,771,200 | 9/1988 | Ritzinger ............................. 310/162 |

FOREIGN PATENT DOCUMENTS

249121  10/1988  Japan .

Primary Examiner—Steven L. Stephan
Assistant Examiner—D. L. Rebsch
Attorney, Agent, or Firm—Fish & Richardson

[57] ABSTRACT

A resonant rotationally oscillating mechanical system has masses supported by a resilient structure held at both ends on a stationary base to define a natural resonance frequency of intended rotational motion about an axis relative to the base. The resilient structure is asymmetrical along the axis. The masses are subject to additional motion relative to the base in directions different from the direction of intended motion. For a selected mode of motion, the masses and the asymmetrical resilient structure are mutually configured, in accordance with equations of motion, to substantially preclude angular motion of one of the masses relative to the base about an axis other than the axis of the intended rotational motion. In another aspect, the resilient structure has one end attached to the base by a coupler that permits that end to move relative to the base, but only at frequencies different from the natural resonance frequency of motion.

12 Claims, 5 Drawing Sheets

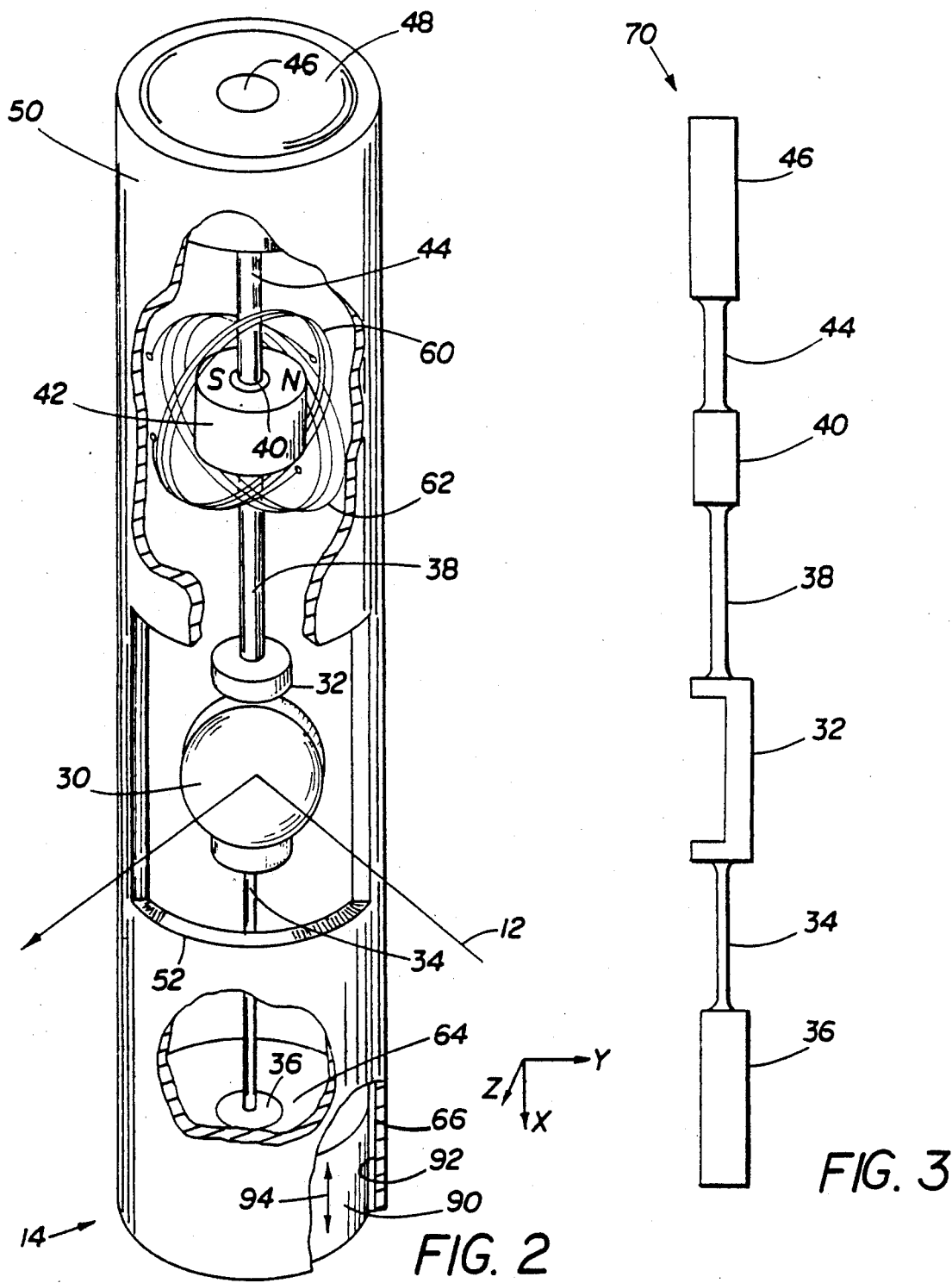

SYMMETRICAL RESONANT SCANNER AND DRIVE

This is a continuation-in-part of co-pending application Ser. No. 014,998, filed Feb. 17, 1987 U.S. Pat. No. 4,878,721.

BACKGROUND OF THE INVENTION

This invention relates to resonant mechanical systems.

In one use of such systems, called laser printing, a focused laser spot is raster-scanned across a light sensitive medium to generate an image. To accomplish high-speed scanning along one dimension of the medium, the laser beam is deflected across by a mirror that is supported symmetrically between two colinear torsion bars to effect resonant rotational motion (see, e.g., Montagu, U.S. Pat. No. 4,502,752, issued Mar. 5, 1985). The beam is slow scanned along the other dimension by moving the medium itself. Practical symmetrical scanners of this design have an upper frequency limit of about 2500 Hz and are relatively complex to make.

In such symmetrical scanners (which are characterized by having an odd number of rotating masses), the centrally supported mirror may be subject to cross-axis vibration. In the fundamental mode of cross-axis vibration, the mirror can move at right angles to the axis without tilting.

It is also known to support a resonantly rotating mirror asymmetrically, for example by mounting it at the free end of a torsion bar, the other end being fixed to the base of the scanner. The armature of a driving element is attached in the middle region of the torsion bar. The stationary part of the driving element is in turn mounted on the fixed base. The torsion bar need not have a uniform cross-section along its length. Such asymmetrical scanners have performance advantages over symmetrical designs, but the mirror is subject to tilt (called wobble), which reduces the accuracy of the scanning. Asymmetrical designs by definition have an even number of masses and thus cannot be constructed symmetrically.

SUMMARY OF THE INVENTION

A scanner in accordance with the invention has a carefully designed asymmetrical structure in which the mirror, although subject to cross-axis wobble when subjected to a static force (as expected), avoids cross-axis wobble in a fundamental mode of cross-axis resonant motion. The invention thus achieves the advantages of a symmetrical scanner in a small, high-performance, simple, inexpensive asymmetrical structure. The dynamic characteristics of the structure are aided, in part, by supporting one end of the torsion bar on a slidable coupler that slowly relieves stress while holding the torsion bar fixed, with respect to motion at the natural resonance frequency.

A general feature of the invention is a resonant rotationally oscillating mechanical system in which a plurality of masses are supported by a resilient structure held at both ends on a stationary base to define a natural resonance frequency of intended rotational motion about an axis relative to the base. The resilient structure is asymmetrical along the axis. The masses are subject to additional motion relative to the base in directions different from the direction of intended motion. For a selected mode of motion, the masses and the asymmetrical resilient structure are mutually configured, in accordance with equations of motion, to substantially preclude angular motion of one of the masses relative to the base about an axis other than the axis of the intended rotational motion.

Preferred embodiments of the invention include the following features.

The resilient structure has one end attached to the base by a coupler that effectively fixes that end against motion at the natural resonance frequency, but permits axial motion at other frequencies to relieve stress. The resilient structure is driven rotationally about an axis of the resilient structure by a mass (e.g., a permanent magnet) mounted at one driving location along its length. Another mass (e.g., an optical element) is driven resonantly at a location along the resilient structure that is spaced apart from the permanent magnet. The resilient structure has first, second, and third torsional segments that all lie along a nominal torsion axis when the system is at rest. The torsional spring constant of the first segment is larger than that of the second, and the second segment's is larger than that of the third. The torsional shear stresses on the three segments is equal. The selected mode of motion (for which angular motion about an axis other than the axis of intended rotation is precluded) is the lowest frequency mode.

The scanner may be rotationally driven by use of a drive coil and a velocity sensing coil. These coils may be wound on the same bobbin, at right angles to each other, for low coupling between the coils, or at other angles for higher torque.

By separating the driving element from the optical element, and supporting them asymmetrically, the construction is simplified and performance is high. Using three properly designed torsional segments minimizes wobble of the optical element in the selected mode of cross-axis vibration. The scanner can be made extremely small.

Another general feature of the invention is a resonant mechanical system having at least one mass supported on a stationary base by a resilient structure to define a natural resonance frequency of intended motion relative to the base. The resilient structure has one end attached to the base by a coupler that permits that end to move relative to the base but only at frequencies lower than the natural resonance frequency of rotational motion.

Preferred embodiments of the invention include the following features.

The coupler has two cooperating cylindrical surfaces located respectively on the resilient structure (a torsion element) and on the base; the surfaces are slidable axially relative to each other and are separated by a gap; the gap contains a soft wax that permits relative axial motion of the surfaces but only at frequencies different than the intended natural frequency. The resilient structure is rigidly attached to the base at a second location spaced apart from the coupler. The mass is mounted on the torsion element between the coupler and the location of rigid attachment.

The coupler minimizes stresses on the resilient element in the axial direction, by permitting low frequency adjustment of the coupler, while minimizing dissipation of energy at the intended natural resonance frequency of rotation.

Other advantages and features will become apparent from the following description of the preferred embodiment, and from the claims.

DESCRIPTION OF THE PREFERRED EMBODIMENT

We first briefly describe the drawings.

Figure 2A:
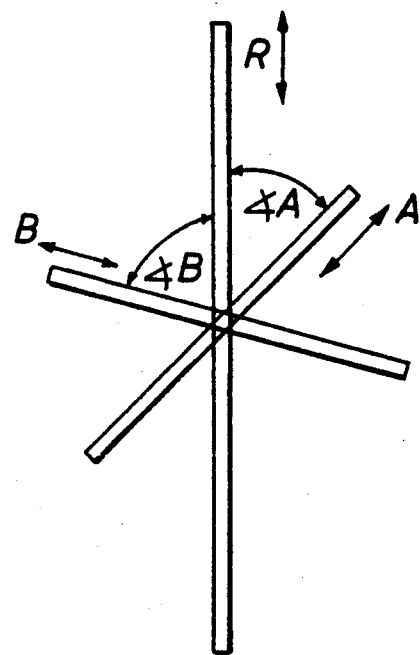
FIG. 2 is a perspective view, not to scale and partially cutaway, of a resonant scanner.

FIG. 2a indicates relative orientations of axis of rotation R, and the respective planes of the drive and sense coils on a single bobbin.

FIG. 3 is a side view of the torsion element of the resonant scanner.

Figure 4:
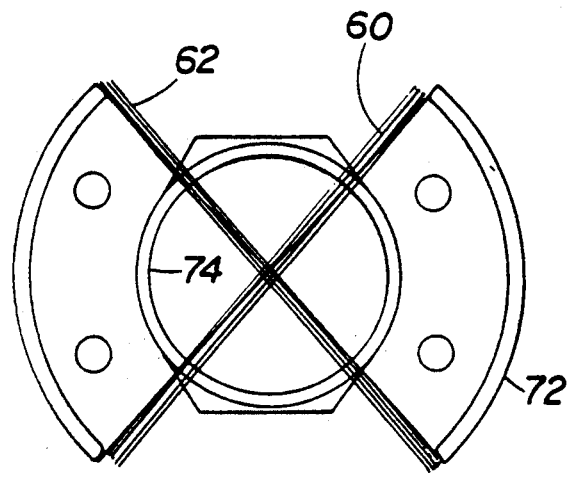
Figure 5:
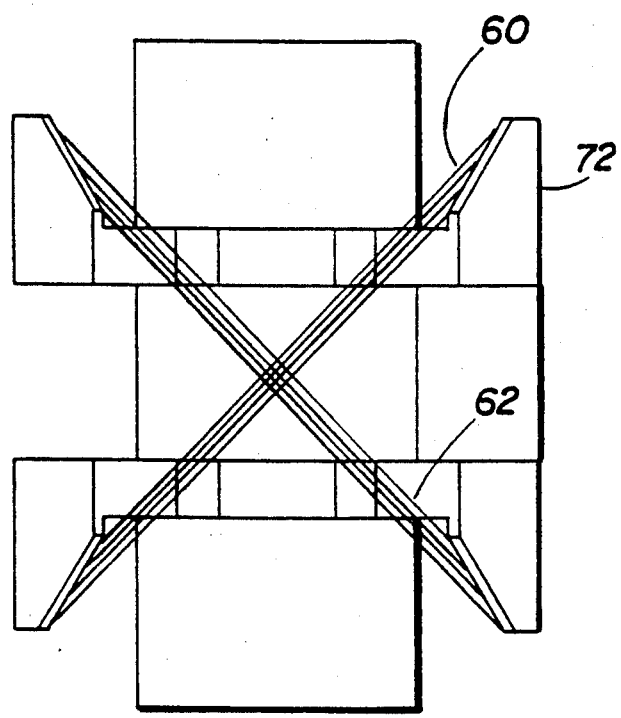

FIGS. 4, 5 are top and side views, respectively, of a bobbin for drive and sensing coils of the resonant scanner.

Figure 6:
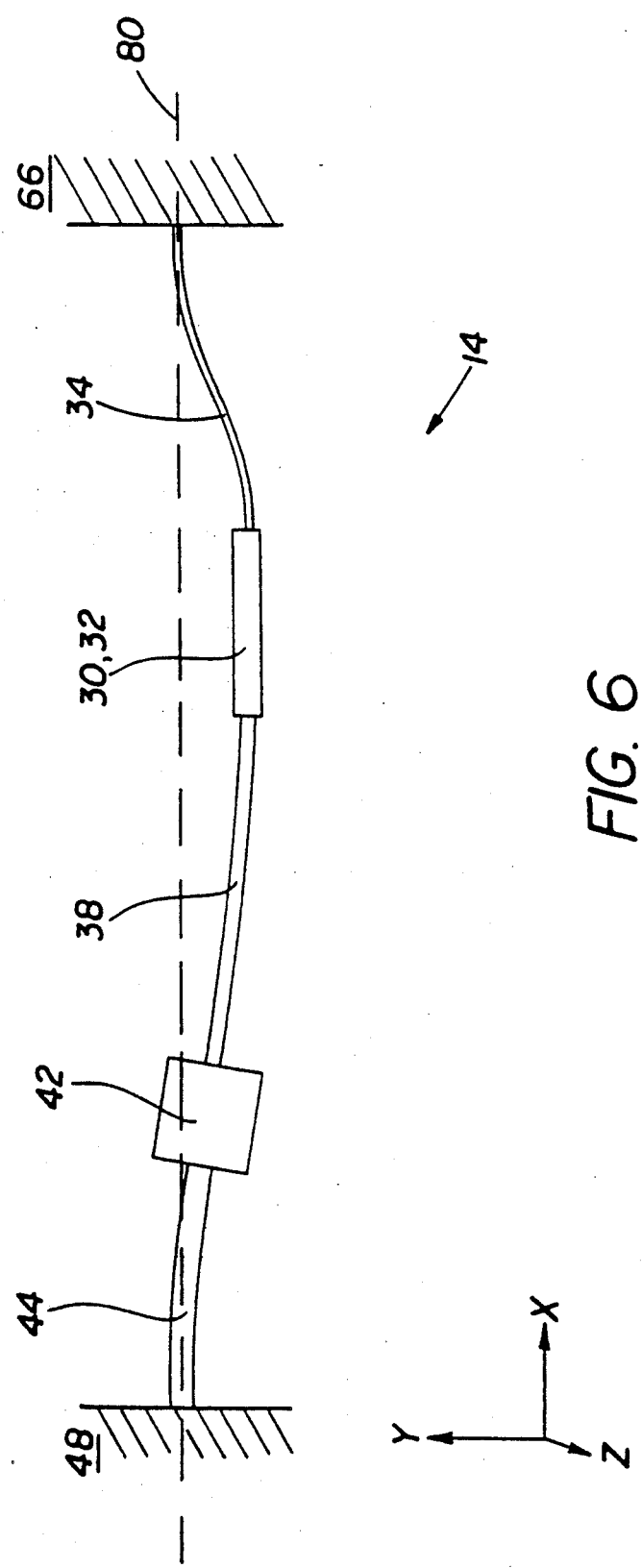

FIG. 6 is a diagram of the scanner in one mode of transverse motion.

Figure 7:
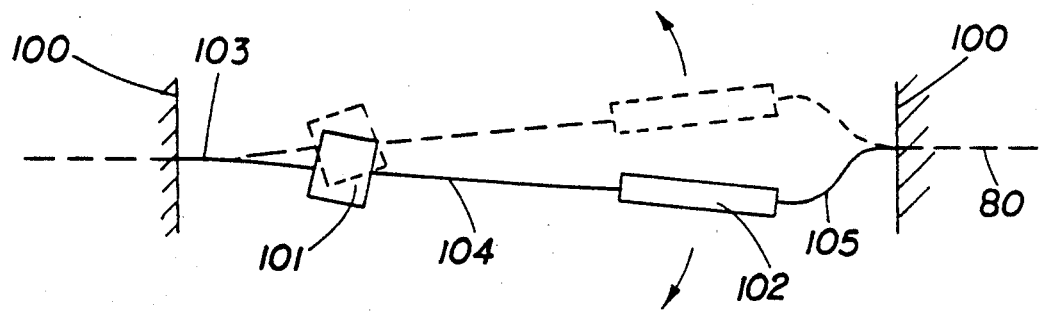
Figure 8:
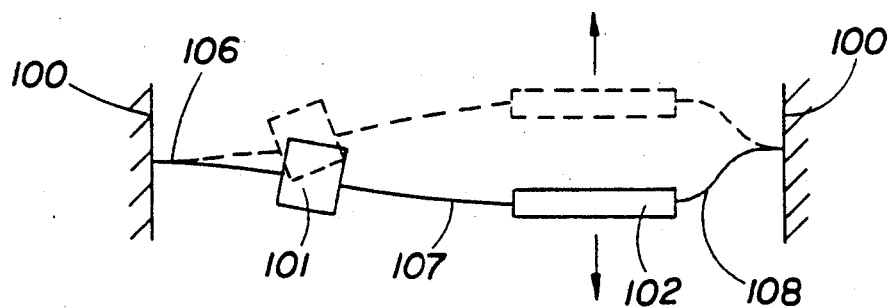
Figure 9:
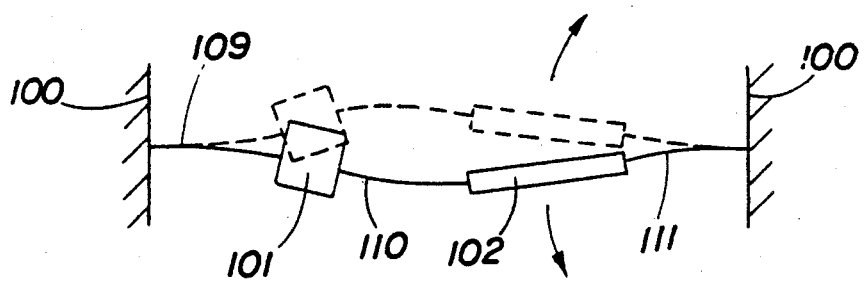

FIGS. 7, 8, 9 are illustrations of three variations of a fundamental cross-axis vibration mode.

STRUCTURE

Figure 1:
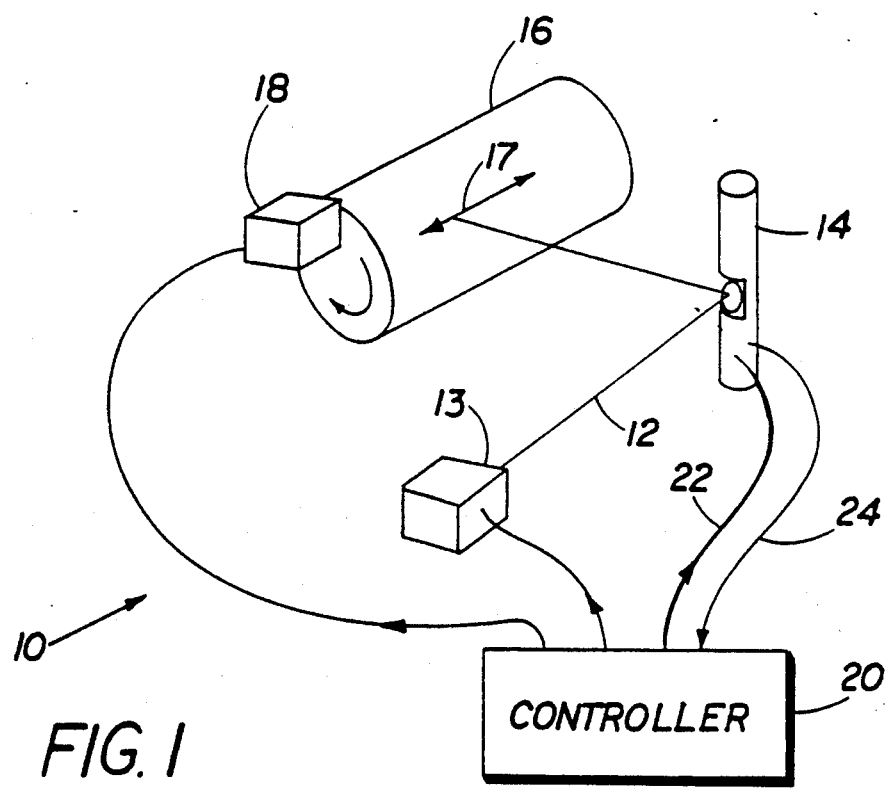
FIG. 1 is a diagram of a laser printing system.

Referring to FIG. 1, in a laser printer 10, a focused laser beam 12 from a laser source 13 is deflected by a high-speed resonant scanner 14 to scan successive lines along the length of a rotating drum (indicated by arrows 17) bearing a light-sensitive medium. Drum 16 is rotated at a slower speed by a drum driver 18 to move the light-sensitive medium to the proper location to receive each successive scan line. A controller 20 coordinates the operation of driver 18, laser beam source 13, and scanner 14. Scanner 14 is driven by signals passed over line 22 based in part on feedback signals received over line 24.

Referring to FIG. 2, in scanner 14 laser beam 12 is deflected by the surface of a mirror 30, mounted on a support 32. Support 32 is part of an asymmetrical torsion bar assembly (structure) having three colinear torsion bar segments. One torsion bar segment 34 extends from one end of support 32 to a cylinder 36 (mounted in a manner to be described). A second torsion bar segment 38 extends from the other end of support 32 to a cylinder 40 on which a cylindrical samarium cobalt drive magnet 42 is mounted. A third torsion bar segment 44 extends from the other end of cylinder 40 to a cylinder 46 which is rigidly attached to a hub 48. Hub 48 is in turn rigidly attached to a low carbon steel tubular housing 50 that has a window 52 for passing beam 12 to and from mirror 30.

A drive coil 60 and a velocity sensing coil 62 are wound about magnet 42 respectively in two planes that intersect. The S and N poles of magnet 42 are aligned with the two intersections of the planes of coils 60, 62 (as shown) when the mirror 30 is at rest in its neutral position. Drive coil 60 and sensor coil 62 are connected respectively to lines 22, 24 (FIG. 1).

Scanner 14 may be rotationally driven by use of drive coil 60 and velocity sensing coil 62. For example, drive coil 60 can supply a driving force to the vibrating element 30 of the scanner, such as by applying a sinusoidally varying torque via magnet 42 at the appropriate phase and amplitude. The sensing coil 62 in turn is used to sense velocity and position of element 30 by sensing velocity of magnet 42. This sensed signal is processed by controller 20 to generate a new drive signal for drive coil 60 responsive to the sensed information.

Preferably, coils 60, 62 are wound about magnet 42 in two planes A and B, respectively, that intersect. Plane A of coil 60 may be at an angle A to the axis of rotation R which is the same as or is different from angle B of sensing coil plane B relative to the axis of rotation R, as shown in FIGS. 2, 2a.

In one arrangement, placing coils 60, 62 at approximately right angles to each other, as shown in FIGS. 4, 5, provides low electromagnetic coupling between the coils. In such instance, the current flowing in the drive coil will not induce a significant signal in the velocity sensing coil. In practice, in the embodiment of FIGS. 4, 5, we have found a coupling component of the velocity signal derived from the drive coil signal will be typically 2% to 10% of the sensed velocity signal. In those cases where some amount of coupling between the velocity sensing coil and the drive coil can be tolerated, or is desired, the angle between the coils can be other than 90°.

The angles between the planes of the two coils and the axis of rotation may not be the same. The actual angles selected will be a design choice based on the consideration of physical space available for the coil and the need to minimize electrical power consumption. The maximum torque produced by the drive coil acting on the moving magnet 42 varies as the cosine of angle A between the drive coil plane A and the axis of rotation R. At a typical angle of 45°, the torque is about 70% of maximum obtainable torque.

Velocity coil 62 is preferably wound first on bobbin 72, and drive coil 60 is wound thereover. In this event, the velocity coil may be wound from smaller gauge wire than that of the drive coil. If the velocity coil is wound on the outside of the drive coil, it will be further from the magnet and the signal will be smaller, typically about 20%. However, such embodiment may be desired where drive coupling is considered more important than velocity sensing.

Cylinder 36 is rigidly attached to a hub 64 and hub 64 is attached to housing 50, but not rigidly. Instead a soft wax (available under the name Door-Ease from TRW of Cleveland, Ohio) capable of cold flow or creep fills a small annular space 66 between the outer wall of hub 64 and the inner wall of housing 50. The soft wax permits hub 64 to slide axially relative to housing 50 to accommodate low frequency changes in the relative lengths of the torsion bar assembly and housing 50 which result, for example, from ambient temperature changes. This minimizes any axial tension or compression on the torsion bar assembly. The soft wax does not, however, permit hub 54 to slide in response to higher frequency vibrations caused, for example, by the rotational motion of mirror 30.

Mirror 30 with armature 40, 42 and the three torsion bar segments thus together form a resonant rotational mechanical system.

Referring to FIG. 3, torsion bar assembly 70 is machined from a single length of type 01 drill rod.

Referring to FIGS. 4, 5, coils 60, 62 are wound on a plastic bobbin 72 whose outer diameter is small enough to just fit within housing 50 and whose inner bore 74 is large enough to accommodate magnet 42.

Dimensions and characteristics of the elements of scanner 14 are as follows:

| | |
|---|---|
| housing 50 | 2.36" long, 0.563" inside diameter, 0.625" outside diameter |
| mirror 30 | 7 mm dia., 2.5 mm thick, located 0.93" from the hub 66 end of scanner |

-continued

| | |
|---|---|
| drive coil 60 | 400 turns #39 wire |
| velocity sensor coil 62 | 400 turns #39 wire |
| magnet 42 | 0.2" long, 0.25" outside diameter, 0.1" inside diameter |
| torsion bar segment 44 | 0.0455" dia., 0.25" long |
| torsion bar segment 38 | 0.0346" dia., 0.387" long |
| torsion bar segment 34 | 0.020" dia., 0.332" long |
| cylinder 46 | 0.1010" dia., 0.400" long |
| cylinder 40 | 0.1010" dia., 0.200" long |
| support 32 | 0.135" dia., 0.393" long |
| cylinder 36 | 0.1010" dia., 0.400" long |
| peak torsion bar stress | 46500 psi at 30 degrees opt peak-to-peak |
| primary torsional resonance frequency | 2575 Hz |
| secondary torsional resonance frequency | 4055 Hz |
| cross-axis resonant frequency | 1050 Hz |
| maximum mirror angle | 7.5 degrees center to peak, mechanical |
| maximum rotor angle | 2.45 degrees center to peak, mechanical |
| drive voltage | 9 volts peak to peak at 20 degrees opt peak-to-peak |
| velocity voltage | 5 volts peak to peak at 20 degrees opt peak-to-peak |
| scan to scan repeatability | better than 0.2 arc-second |
| scan to scan repeatability | 6 to 8 arc-second |

(Note that the inertia of the magnet about the X axis is nearly 254 times as large as the mirror inertia about the X axis.)

Operation

Referring to FIG. 6, in normal operation, scanner 14 is driven in resonant rotational motion about a nominal torsion axis 80 (the X-axis) on which torsion segments 34, 38, 44 normally lie. The resonant motion is achieved by applying an ac current to coil 60 in a conventional manner based in part on the velocity signal from coil 62 (see, e.g., Montagu, U.S. Pat. No. 4,076,798, and Selverstone, U.S. Pat. No. 4,090,112)

A two body, three spring system such as scanner 14 can undergo four modes of cross-axis vibration. Referring to FIGS. 7, 8, 9, there are three variations of the fundamental mode of vibration. Note that only one of these variations can occur with any given configuration of elements.

In the variation of FIG. 7, both masses 101, 102 translate (cross-axis) and wobble (about an axis normal to the torsion axis 80) in phase with each other. In the variation of FIG. 9, the masses translate in phase, but they rotate 180 degrees out of phase with each other. In the variation of FIG. 8, the translations are in phase, but the rotation of one of the masses (102) is exactly midway between being in phase and 180 degrees out of phase with the other mass. As a result, the amplitude of rotation (in cross-axis or wobble mode) for that mass is zero. This condition is analogous to a symmetrical system vibrating cross-axis in its fundamental mode. Note that although a static force applied to the center of the optical element in a symmetrical system will not cause the element to tilt, in the present asymmetrical scanner 14 such a static force will cause the optical element to tilt. This distinction is critical. The asymmetrical scanners of the present invention only mimic the dynamic behavior of a symmetrical scanner, and do so only in the fundamental transverse vibration mode.

In a three torsion bar segment, two mass scanner as in FIG. 6, the phase and amplitude of rotation of the optical element 30, 32 in the fundamental cross-axis resonance mode can be controlled to exhibit the desired variation represented in FIG. 8 by proper choice of bending stiffnesses of the three torsion bar segments. Such stiffnesses are a function of the torsion bar segment diameters, lengths, and material properties. In the preferred embodiment the material properties of the three segments are the same, but in other embodiments need not be. Furthermore, the selection of the bending stiffnesses can be accomplished without altering the desired natural rotational resonance of the scanner (about the nominal torsion axis). In addition, equal torsional shear stresses can be maintained on all three torsion bar segments. This desirably results in the shortest possible combined length, and thus the highest possible cross-axis resonance frequency.

The following tables illustrate the configurations of the torsion bar segments for three variations of fundamental mode cross-axis motion and show why the FIG. 8 variation was selected for the design of the preferred embodiment. (Diameters and lengths are in cm; k is the torsional spring constant in dyne-cm/radian; stress i the torsional shear stress in psi; and amplitude is the ratio of wobble rotation to translation of the optical element's fundamental cross-axis resonance in radians/cm. In a typical scanner application the cross-axis resonance rotational amplitudes would be many orders of magnitude smaller than the torsional amplitudes.) Note that in all cases the stresses on the the torsion bar segments are equal.

Variation of FIG. 7
torsion bar segment 103—0.1194 dia×0.635 length; k=0.3940; stress=41616
torsion bar segment 104—0.0918 dia×1.213 length; k=0.0723; stress=41616
torsion bar segment 105—0.0508 dia×0.9411 length; k=0.0087; stress=41616
primary cross-axis resonance: 859 Hz; amplitude=0.1056
primary torsional resonance: 2500 Hz
Variation of FIG. 8
torsion bar segment 106—0.1175 dia×0.635 length; k=0.3694; stress=46503
torsion bar segment 107—0.0879 dia×0.9824 length; k=0.0749; stress=46503
torsion bar segment 108—0.0508 dia×0.8422 length; k=0.0097; stress=46503
primary cross-axis resonance: 957 Hz, amplitude=0.00053
primary torsional resonance: 2500 Hz
Variation of FIG. 9
torsion bar segment 109—0.1156 dia×0.635 length; k=0.3461; stress=52539
torsion bar segment 110—0.0837 dia×0.7684 length; k=0.0787; stress=52539
torsion bar segment 111—0.0508 dia×0.7455 length; k=0.0110; stress=52539
primary cross axis resonance: 1048 Hz, amplitude=0.1566
primary torsional resonance; 2500 Hz Note that the optical element cross-axis resonance amplitude of FIG. 8 is more than 200 times smaller than either of the other two variations. Also note that the amplitude of FIG. 9 has changed sign from the other two modes.

The parameters in the above tables were developed by first solving the following equations (which describe a two degree of freedom system resonating in torsion) to obtain the torsion bar sizes. The resonant frequencies and amplitudes were calculated using finite element analysis and the additional intertia and mass parameters listed.

$K_1 = D_1^4 G\pi/32L_1$
$K_2 = D_2^4 G\pi/32L_2$
$K_3 = D_3^4 G\pi/32L_3$
$T_1 = \theta_1 K_1$
$T_2 = \theta_1[(2\pi f)^2 J_1 - K_1]$
$T_3 = T_2 + (2\pi f)^2 J_2 \theta_2$
$\theta_2 = \theta_1 - T_2/K_2$
$\theta_3 = \theta_2 - T_3/K_3$
$S_1 = \theta_1 D_1 G/(2L_1)$
$S_2 = (\theta_1 - \theta_2) D_2 G/(2L_2)$
$S_3 = (\theta_2 - \theta_3) D_3 G/(2L_3)$
$S_2 = S_1$
$S_2 = S_3$ where the variables have the following meanings.

| | |
|---|---|
| G | modulus of elasticity |
| f | resonant frequency |
| $J_1$ | mirror 30 and mount 32 inertia about the X axis |
| $J_2$ | magnet 42 inertia about the Y axis |
| $D_1$ | torsion segment 34 diameter |
| $L_1$ | torsion segment 34 length |
| $D_2$ | torsion segment 38 diameter |
| $L_2$ | torsion segment 38 length |
| $D_3$ | torsion segment 44 diameter |
| $L_3$ | torsion segment 44 length |
| $K_1$ | torsion segment 34 spring constant |
| $K_2$ | torsion segment 38 spring constant |
| $K_3$ | torsion segment 44 spring constant |
| $S_1$ | torsion segment 34 stress |
| $S_2$ | torsion segment 38 stress |
| $S_3$ | torsion segment 44 stress |
| $\theta_1$ | maximum angle of mirror 30, center to peak, mechanical |
| $\theta_2$ | maximum angle of magnet 42, center to peak, mechanical |
| $\theta_3$ | angle at clamped end 48 (= zero) |
| $T_1$ | maximum torque on torsion segment 34 |
| $T_2$ | maximum torque on torsion segment 38 |
| $T_3$ | maximum torque on torsion segment 44 |

The following variables were assigned fixed values:

$G = 8.112 \times 10^{11}$ dyne/cm$^2$, f = 2500 Hz, $\theta_1 = 7.5$ degrees, and

| | |
|---|---|
| Magnet rotational inertia about the X axis | = 0.0563 g-cm$^2$ |
| Magnet rotational inertia about the Y axis | = 0.05404 g-cm$^2$ |
| Magnet rotational inertia about the Z axis | = 0.05404 g-cm$^2$ |
| Mirror rotational inertia about the X axis | = 0.0158 g-cm$^2$ |
| Mirror rotational inertia about the Y axis | = 0.05635 g-cm$^2$ |
| Mirror rotational inertia about the Z axis | = 0.05484 g-cm$^2$ |
| Magnet mass | = 1.202 g |
| Mirror mass | = 0.5927 g |

Referring again to FIG. 2, the outer cylindrical surface 90 of hub 64 and the corresponding inner cylindrical surface 92 of housing 50 can slide relative to one another in the x-axis direction (as indicated by arrows 94) and thus form a coupler. The wax in space 66 permits low frequency motion, but prevents high frequency motion. Slow motion caused by wear or ambient temperature shifts are accommodated while vibration corresponding to the resonant motion of mirror 30 is not (thus minimizing the dissipation of energy).

Other embodiments are within the following claims. For example, the scanner can be made even smaller than in the preferred embodiment.

I claim:

1. A rotational mechanical system comprising
a rotational structure arranged for rotational motion about an axis and comprising a driver magnet,
two coils arranged in fixed positions relative to said magnet and adapted to cooperate magnetically with said magnet,
one of said coils inclined at a first coil angle to the axis of rotation,
the other of said coils inclined at a second coil angle to the axis of rotation,
the one coil being used to drive the magnet and the other coil being used to sense the motion of the magnet.

2. The system of claim 1 wherein the coils are inclined at equal and opposite angles to the axis of rotation.

3. The system of claim 1 wherein the coils are cooperatively disposed one to the other with a low amount of electromagnetic coupling between the coils.

4. The system of claim 1 wherein the coils are approximately at right angles to each other.

5. The system of claim 1 wherein the coils are at approximately 45° to each other.

6. The system of claim 1 wherein the two coils have a coupling component of approximately 2%.

7. The system of claim 1 wherein the two coils have a coupling component of approximately 10%.

8. The system of claim 1 wherein the coils are at approximately 45° to each other.

9. The system of claim 1 wherein the coils are wound on a single bobbin.

10. The system of claim 9 wherein the other coil is wound first on the bobbin and the one coil is wound over the other coil.

11. The system of claim 1 wherein the other coil comprises smaller gauge wire than the one coil.

12. The system of claim 1 wherein the coils are coupled to a controller whereby movement of the rotational structure can be controlled.

* * * * *

UNITED STATES PATENT AND TRADEMARK OFFICE
CERTIFICATE OF CORRECTION

PATENT NO. : 4,990,808

DATED : February 5, 1991

INVENTOR(S) : Dean R. Paulsen

It is certified that error appears in the above-identified patent and that said Letters Patent is hereby corrected as shown below:

On the title page and column 1, lines 1 - 2;
    Title should be --ASYMMETRICAL--;

Col. 1, line 6-7; insert --.-- after "1987", delete rest of line;

Col. 5, line 26; "254" should be --4--

Col. 6, line 18; "i" should be --is--.

Signed and Sealed this

First Day of December, 1992

Attest:

DOUGLAS B. COMER

Attesting Officer      Acting Commissioner of Patents and Trademarks